United States Patent [19]

Gaubert

[11] 4,143,725

[45] Mar. 13, 1979

[54] METHOD AND APPARATUS FOR SEPARATING BULK ELONGATED PRODUCTS INTO QUANTITIES OF PREDETERMINED WEIGHT

[76] Inventor: Rene J. Gaubert, 4219 Oakmore Rd., Oakland, Calif. 94602

[21] Appl. No.: 837,217

[22] Filed: Sep. 27, 1977

[51] Int. Cl.² ............................................. G01G 13/02
[52] U.S. Cl. ......................................... 177/123; 177/1
[58] Field of Search ........ 177/105, 108, 116, 121–123, 177/1, DIG. 11

[56] References Cited

U.S. PATENT DOCUMENTS

| | | | |
|---|---|---|---|
| 2,827,001 | 3/1958 | Curioni | 177/105 X |
| 2,950,894 | 8/1960 | Hillman | 177/121 |
| 3,090,453 | 5/1963 | Rosen | 177/121 X |
| 3,135,343 | 6/1964 | Stambera | 177/122 X |
| 3,752,244 | 8/1973 | Rouban | 177/123 X |
| 3,957,126 | 5/1976 | Hobart | 177/DIG. 11 |
| 4,010,809 | 3/1977 | Hobart | 177/123 X |

Primary Examiner—George H. Miller, Jr.
Attorney, Agent, or Firm—Flehr, Hohbach, Test, Albritton & Herbert

[57] ABSTRACT

A weighing apparatus for separating elongated products in bulk into quantities of a predetermined desired weight. The apparatus includes a weighing chute for receiving the elongated product, a weigher connected to the chute, and a sensor actuated by the weigher for producing control responses as the weight of product in the chute approaches the desired weight. The weigher further includes a dribbling apparatus responsive to the control responses for dribbling the product into the chute at a rate which is decreased as the desired weight is approached and for stopping when the predetermined weight is achieved.

21 Claims, 5 Drawing Figures

METHOD AND APPARATUS FOR SEPARATING BULK ELONGATED PRODUCTS INTO QUANTITIES OF PREDETERMINED WEIGHT

BACKGROUND OF THE INVENTION

1. Field of the Invention

This invention generally relates to product weighing devices and, more particularly, to high speed weighing devices that dispense a predetermined volume of product into a hopper and thereafter dribble additional product into the hopper to bring the weight of the product up to a desired predetermined weight.

2. Description of the Prior Art

In the past various methods and machines have been used for packaging elongated products such as spaghetti, macaroni, straws, carrots, celery, pencils, and licorice sticks. These packaging machines have been developed over the years to operate at relatively high speeds. With this increase in packaging speed has developed the necessity of increasing the speed at which these elongated products can be separated into quantities of a desired weight prior to packaging. Heretofore, the packaging operations in some lines were unable to achieve maximum speed because the product weighers slowed the line down.

In addition, there has been an increasing need to weigh the product more accurately so that the amount of overweight product in each package is reduced. With the costs of the product increasing any reduction in overweight can produce a significant reduction in the overall cost of producing the product.

The present invention is an improvement of the apparatus disclosed in my earlier patent entitled "Spaghetti Wrapping Machine and Method," U.S. Pat. No. 3,230,686, by Rene Gaubert, issued Jan. 25, 1966.

SUMMARY OF THE INVENTION

It is an object of the present invention to provide a novel method and apparatus that overcomes the limitations and disadvantages of the prior art.

A further object of the present invention is to separate bulk elongated products into quantities of desired weight at higher speeds than heretofore obtainable. This high speed separation thereby permits conjointly operating wrapping machines in the same line to operate at faster speeds.

An additional object of the present invention is to weigh elongated products with greater accuracy and to reduce the amount of overweight product in each package.

These and other objects are achieved by a method and apparatus for separating bulk elongated products into quantities of predetermined weight. The apparatus includes a weighing chute for receiving predetermined volumes of the elongated product that are short of the desired weight and for receiving additional elongated product dribbled into the chute as the weight of the product is brought up to the desired weight. The weight of the product in the chute is measured by a weigher which actuates a sensor for producing control responses as the weight of product in the chute approaches and achieves the desired weight. The apparatus also includes a dribbling apparatus responsive to the control responses for dribbling the product into the chute at a rate which is decreased as the desired weight is approached and for stopping when the desired weight is achieved.

Additional objects and features of the invention will appear from the following description in which the preferred embodiment has been set forth in detail in conjunction with the accompanying drawings.

DESCRIPTION OF THE PREFERRED EMBODIMENT

Figure 1:
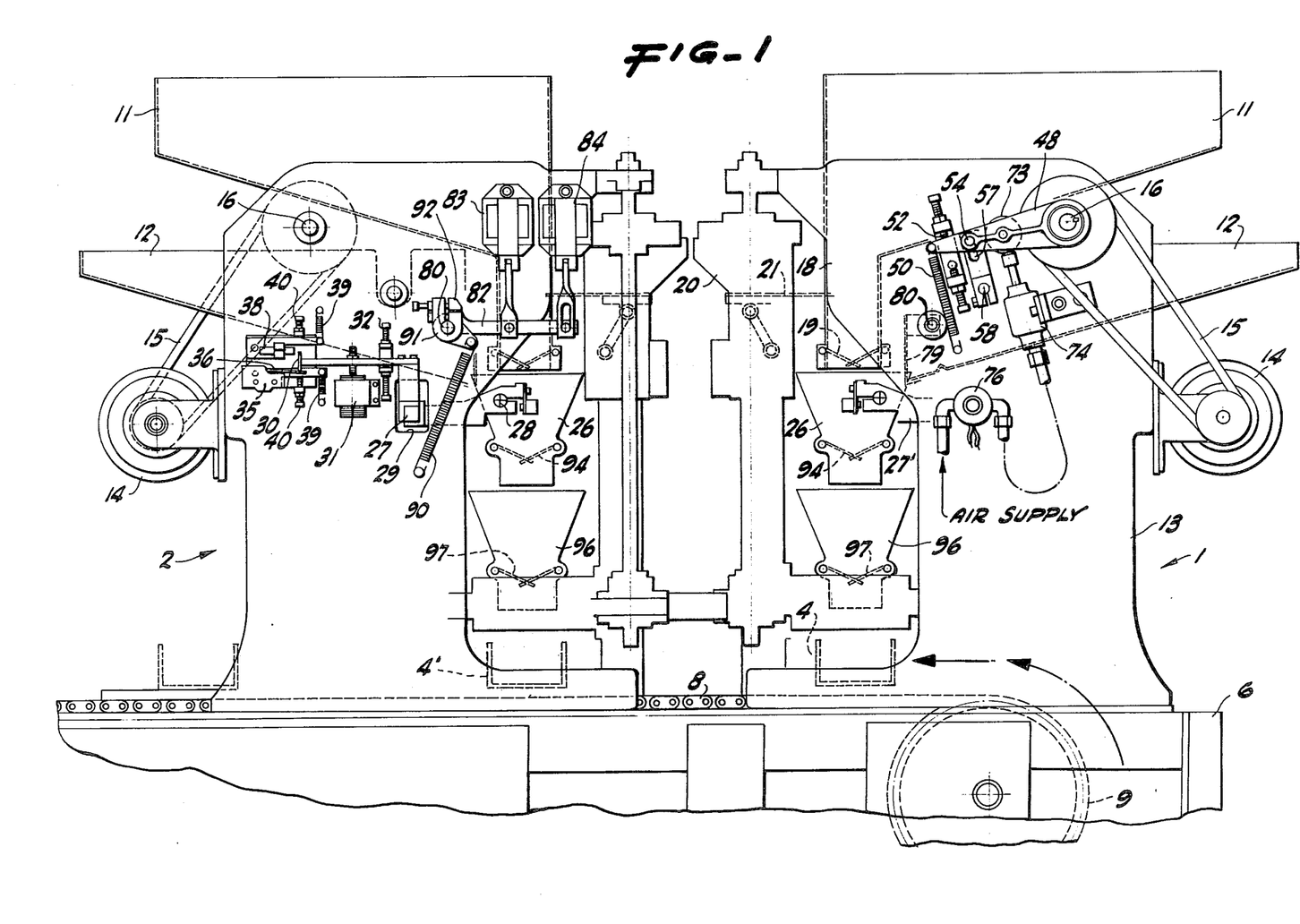
FIG. 1 is a side elevational view, partially cut away, of two weighers of elongated products each incorporating the present invention.

Referring to FIG. 1, reference numerals 1 and 2 indicate, respectively, two weighers for separating bulk elongated products into quantities of predetermined weight. The weighers serve to receive the product from a bulk source, to separate it by volume, to adjust the weight of the separated amount, and to deliver the desired weight into the buckets 4, 4', at the weigher station. The weighers 1, 2 are identical in construction and operate in duplex. The weighers are positioned facing each other on the frame 6 of a packaging machine.

In the preferred embodiment the weighers are described as separating dry spaghetti. It should be understood, however, that the present invention has application in separating any bulk, elongated product. Such products include macaroni, straws, carrots, celery, pencils, and licorice sticks.

In the preferred embodiment the spaghetti, after being separated into quantities of the desired weight, is delivered to the buckets 4, FIG. 1, and is placed upon precut sheets of wrapping material. The packaging machine thereafter folds the wrapping material about the spaghetti and seals it into a package suitable for retail sale. The buckets 4, 4', are driven by a main chain 8 and a sprocket 9. The timing of each weigher is controlled by a timing chain (not shown) which is driven by the main chain.

Since the weighers are identical in both construction and operation, only one weigher is described in detail below. It should be understood, however, that the preferred embodiment includes two weighers as illustrated in FIG. 1. Each weigher includes a main hopper 11, FIG. 1, and a dribbler hopper 12. Both hoppers are maintained in constant cyclic rotary motion with respect to the side plates 13 of each weigher. The rotary motion is accomplished by an electric motor 14 which continuously drives the belt 15 that supplies power to a shaft 16. This shaft is journaled to the side plates and has an eccentric (not shown) which drives the two hoppers. The side plates are stationary and are rigidly attached to the frame 6 of the packaging machine.

The bottom walls of the hoppers 11, 12 are downwardly inclined and the constant motion of the hoppers tends to pack the spaghetti therein and to align the various sticks with respect to each other. The main hopper 11, FIG. 1, terminates into a first chute 18. The bottom of this chute may be held closed by two intermeshed gates 19 which are geared to act symmetrically. Adjacent to the first chute is a volumetric separator 20 which includes a plurality of fingers 21 each of which is insertable into the chute. When the fingers 21 are inserted into the first chute by the separator, the spaghetti therein is physically separated from the spaghetti in the upper part of the hopper. The fingers thus measure off a predetermined volume of spaghetti between the bottom of the fingers 21 and the gates 19. The volumetric separator 20 is also vertically displaceable in order to vary the size of the volume obtained by the fingers.

As the main hopper 11, FIG. 1, is continuously vibrated, the spaghetti contained therein is continually packed and tends to travel down the inclined bottom wall of the hopper into the first chute 18. The weigher is timed so that the gates 19 are initially closed and the fingers 21 are held in a withdrawn position as illustrated in FIG. 1. After sufficient time has elapsed for the chute 18 to fill, the fingers are extended into the chute by the volumetric separator. As illustrated in weigher 1, FIG. 1, the fingers 21 are extended from left to right. The motion of the fingers into the chute separates the spaghetti in the upper portion of the chute from that in the lower portion thereof. While the fingers are still extended into the chute, the gates 19 are opened and the predetermined volume of spaghetti falls into the next lower chute.

The construction and operation of the main hopper 11, FIG. 1, volumetric separator 20, and first chute 18 is further described in my earlier patent cited above.

The volumetric separation is followed by a weighing operation. The weight of the spaghetti separated by the volumetric separator 20 is selected to be less than the desired weight. A dribble feed is thereafter utilized to add additional spaghetti and to bring the separated amount up to the desired weight.

The volumetrically separated spaghetti falls into a scale or weighing chute 26, FIG. 1. The scale chute receives the predetermined volumes of spaghetti that are short of the desired weight and also receives additional spaghetti dribbled into the chute to bring the weight of the product up to the desired weight. The scale chute is disposed directly below the first chute 18 and is held in place by the arms 27, 27'. These arms form a beam balance scale that has a fulcrum 28 attached to the side plates 13. The scale arm 27 and the fulcrum in FIG. 1 are located behind the side plate 13 of the weigher 2. The free end of scale arm is passed through a slot 29 in the side plate and then along the outward side of the side plate as illustrated in FIG. 1. The scale arm terminates with a vertical plate 30 which actuates a plurality of sensors as described below. A dash pot 31 is attached to the scale arm for damping the motion of the scale chute 26 and the scale arm while the spaghetti is poured into the chute. The motion of the scale arm is also limited by two mechanical stops 32 mounted on the side plate of the weigher.

Figure 2:
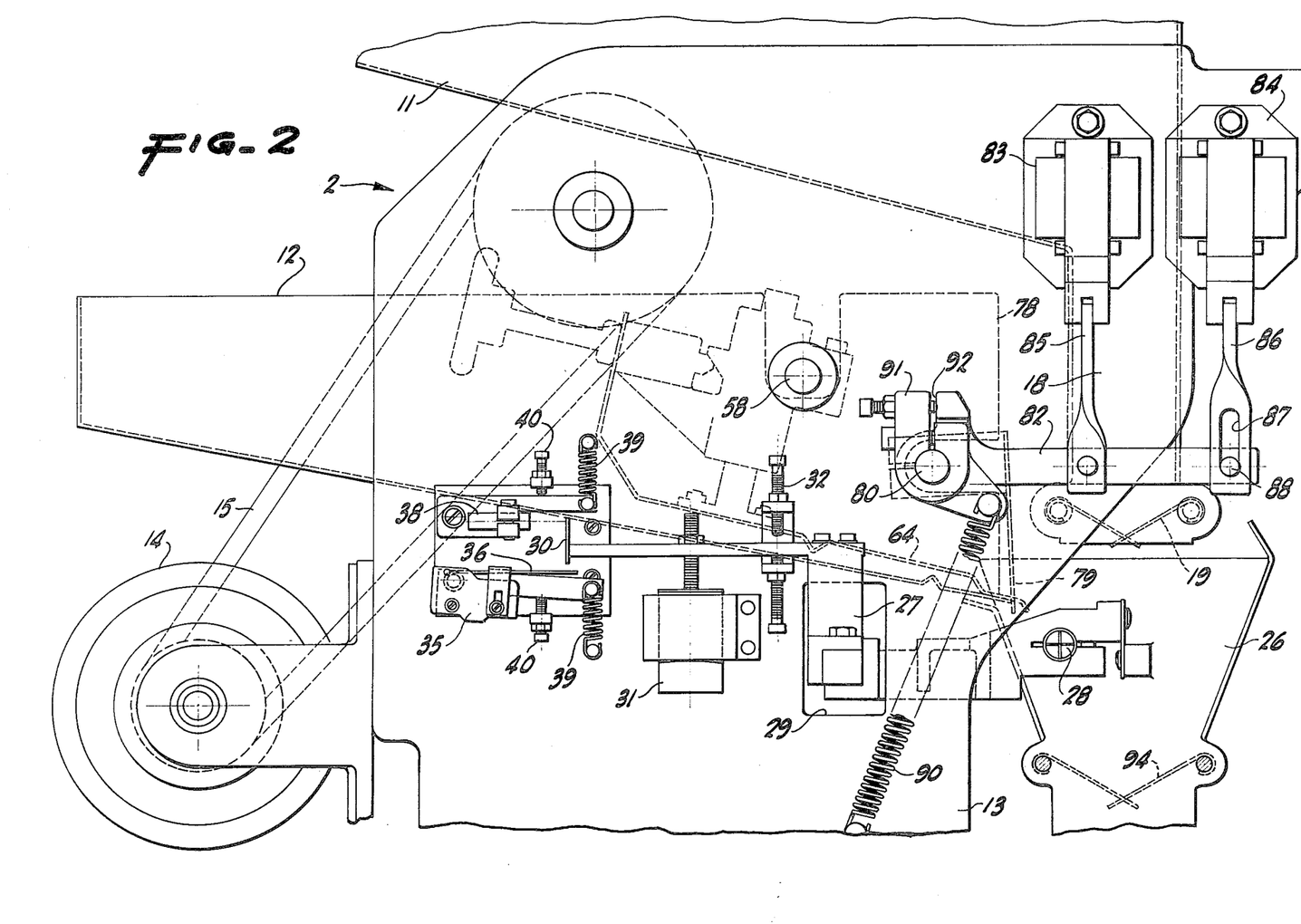
FIG. 2 is a side elevational view of the upper portion of the left weigher of FIG. 1.

Referring to FIG. 2, when the scale chute 26 is empty, it is in an upward position and the actuator plate 30 on the other side of the fulcrum 28 is depressing a blade 36 on the microswitch 35. When the blade on this microswitch is depressed, solenoid 83 is energized and the operating arm of the pneumatic cylinder 74 is retracted as described below. Solenoid 84 is also energized because the light beam in the photocell 38 is unblocked as further described below. As the spaghetti is dribbled into the scale chute, the actuator plate 30 raises and releases the blade 36 on the microswitch. When the blade is fully released, solenoid 83 is de-energized and the operating shaft of the pneumatic cylinder 73 is extended. The spaghetti continues to be dribbled into the scale chute 26 until the desired weight is achieved. This is indicated by the actuator plate 30 rising sufficiently to block the light beam in the photocell 38. When the light beam is blocked, solenoid 84 is de-energized and the dribbling is stopped by the gate 78. The photocell has a highly collimated light beam and can sense the position of the scale arm with a high degree of precision. The microswitch and the photocell are mounted on the side plate 13 and the positions of actuation are adjusted by the spring 39 and the adjusting bolts 40.

Figure 3:
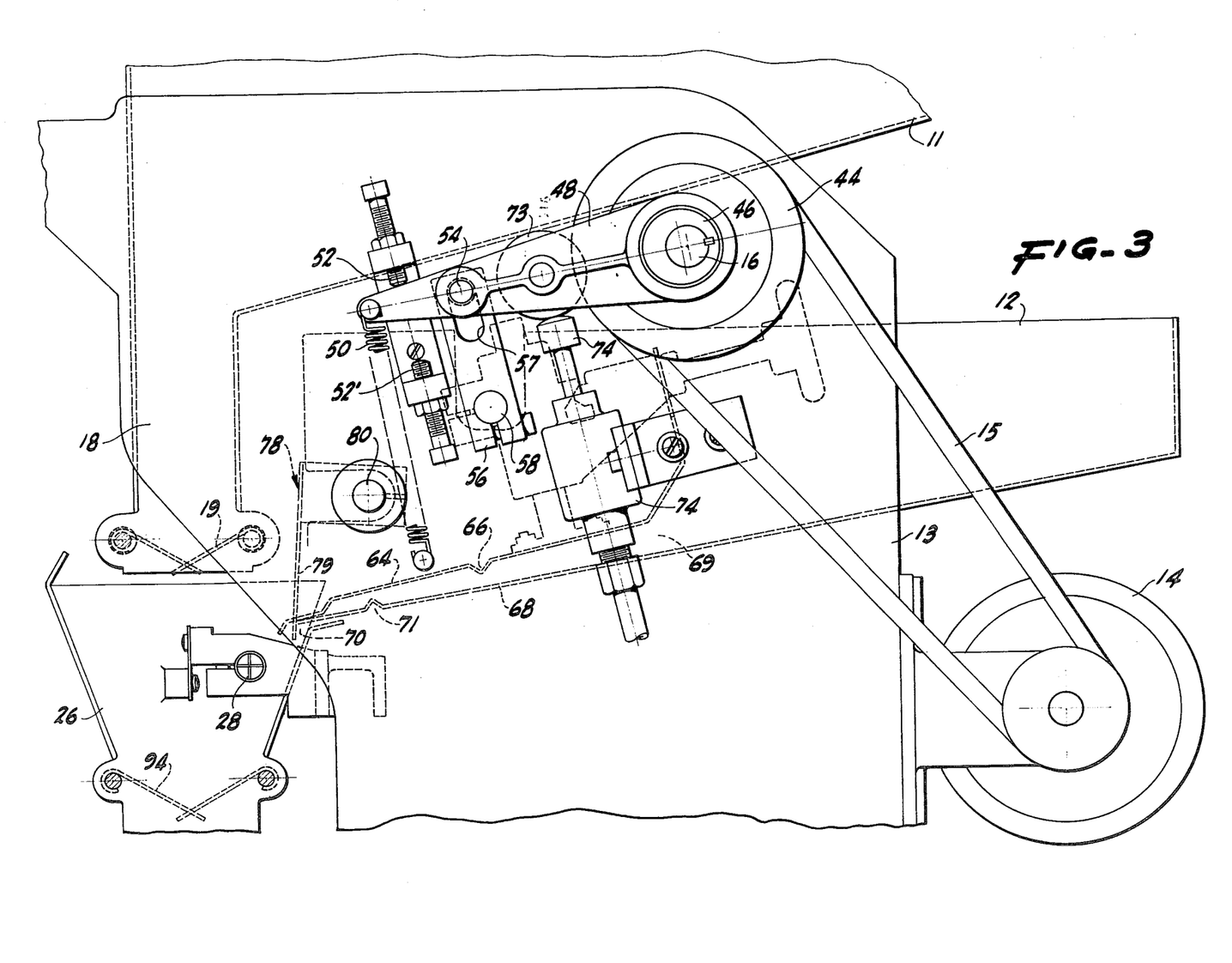
FIG. 3 is a side elevational view of the upper portion of the right weigher of FIG. 1.

Referring to FIG. 3, the electric motor 14 is rigidly mounted on the vertical side plates 13 of the weigher. The motor drives a pulley 44 continuously via a belt 15. The pulley in turn rotates the shaft 16 which is connected by an eccentric drive to the main hopper 11 and the dribbler hopper 13. Rotation of the shaft 16 causes the two hoppers to move continuously with a cyclic rotary motion along a generally elliptical path. Both hoppers are mounted to the stationary side plates 13 with vibration mountings (not shown) which permit this cyclic rotary motion.

Referring to FIG. 3, the shaft 16 is also keyed to an eccentric bearing 46 which is also driven by the electric motor 14. The eccentric bearing is journaled into an arm 48 that extends generally in a direction parallel with the bottom walls of the hopper. Rotation of the shaft 16 causes the arm 48 to move with a cyclical rotary motion and a longitudinal axis of the arm is oriented substantially parallel with the direction of maximum displacement of the eccentric. The arm is also urged in a counter clockwise direction about the shaft 16 as illustrated in FIG. 3 by a spring 50 which is connected to the side plate 13 of the weigher. The motion of the arm 48 is restrained between two adjustable mechanical stops 52, 52', which are likewise mounted on the side plate 13 of the weigher.

The arm 48, FIG. 3, has a stub shaft 54 mounted perpendicular to the plane of the arm and along the longitudinal axis thereof. The stub shaft carries a roller (not shown) that engages the walls of an elongate slot 57 in a second arm 56. This second arm is rigidly attached to a shaft 58. The longitudinal axis of the slot 57 is generally tangent to a circle centered about the shaft 16. This orientation of the elongate slot permits the stub shaft to move from one end of the slot to the other without mechanical interference while shaft 16 is turning. The cyclical rotary motion of the arm 48 is translated by the stub shaft 54 and the second arm 56 into an oscillatory motion of the shaft 58. This shaft 58 is journaled through the side plate 13 and oscillates the upper member 64 of the dribbling assembly.

Figure 4:
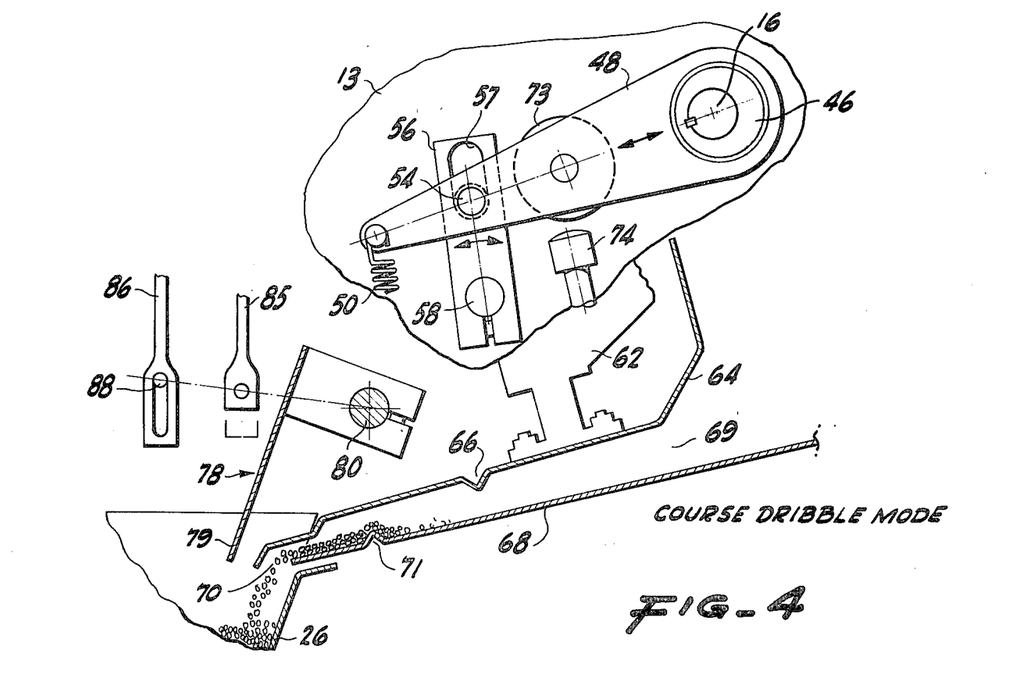
FIG. 4 is a diagrammatic view of the restricted path within each weigher through which the elongated product moves and illustrating the course dribble mode of operation.

Referring to FIG. 4, the shaft 58 is rigidly connected to a dribbler plate assembly 60 which includes an upper dribble plate 64, a supporting member 62, and a hand wheel 65 for adjusting the position of the upper dribble plate. The upper dribble plate is a generally planar member extending across the dribble hopper 12. The upper dribble plate is rigidly attached to the supporting member 62 and is oscillated therewith. The hand wheel permits the upper dribble plate and the supporting member to be moved laterally with respect to the shaft 58 so that the effective area of the restricted path in the dribbling apparatus can be adjusted. The dribble hopper 12, FIG. 3, also has a bottom wall 68 that forms a lower dribble plate at its lower inclined end. As illustrated in FIG. 3, the upper and lower dribble plates 64, 68, are two spaced members forming a restricted path for the spaghetti to flow out of the dribble hopper. The members are generally parallel, extend laterally across the dribble hopper and are inclined to the horizontal.

The spaghetti to be dribbled is held in bulk in the upper right hand portion of the dribble hopper 12, FIG. 3, and it travels by gravity into the upper inlet end 69 of the restricted path. The upper dribble plate 64 has a lateral rib 66 that extends across the path of the spaghetti and acts as a barrier. This barrier forms a throttling throat to block the flow of the spaghetti and to reduce the vertical dimension of the spaghetti between the spaced members. The lower dribble plate 68 also has a rib 71 extending laterally across the path of the spaghetti. This second rib 71 forms a dam that acts as a barrier for the spaghetti to cross. The spaghetti cascades stick by stick in single file over the top of the rib 71 and onto the discharge end 70 of the restriction. The discharge end is formed by the lower terminal ends of the upper and lower dribble plates 64, 68.

It should be appreciated that the spaghetti travels down the restricted path while the lower dribble plate 68 is subjected to a cyclical rotary motion due to the motion of the dribble hopper 12 and while the upper dribble plate 64 is subjected to an oscillatory motion about the shaft 58 by the eccentric motion of the arm 48. Shaft 58 is journaled to the two stationary side plates 13. These two motions coupled with the inclination of the restricted path causes the spaghetti to dribble out of the discharge outlet 70 and into the scale chute 26 at precisely derterminable rates.

Figure 5:
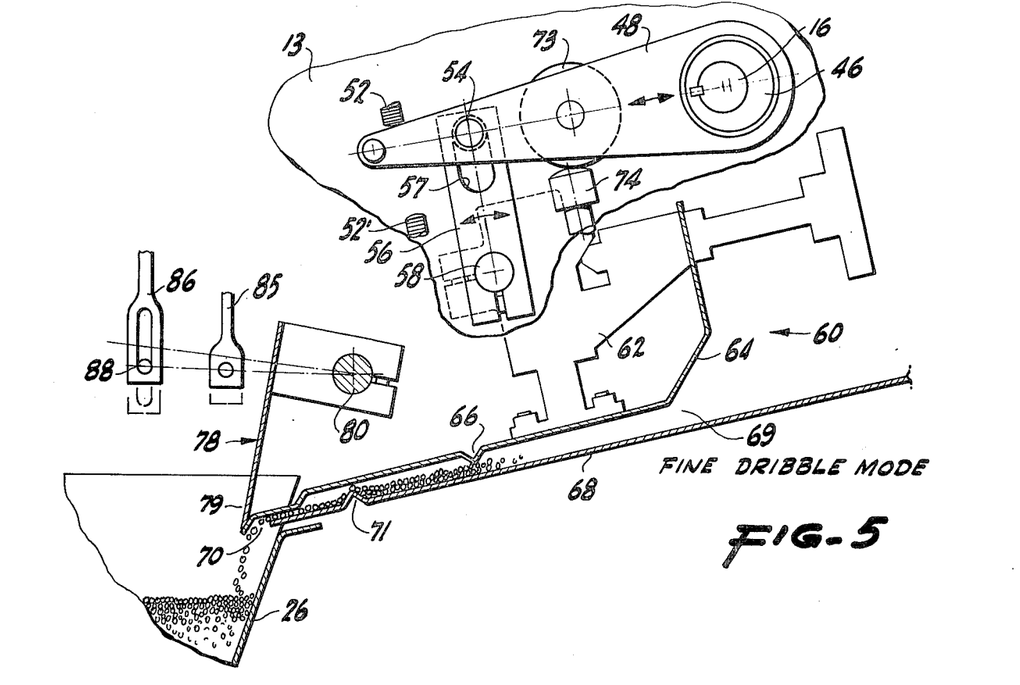
FIG. 5 is a diagrammatic view of the restricted path of FIG. 4, illustrating the fine dribble mode of operation.

Referring to FIGS. 4 and 5, the amplitude of the oscillatory motion of the upper dribble plate 64 can be varied by locating the stub shaft 54 at various positions within the elongate slot 57. The arm 56 in effect has a variable length while the arm 48 has a fixed stroke. When the arm 48 is positioned as illustrated in FIG. 4, the apparatus is operating in the course dribble mode and the maximum amount of spaghetti is dribbled through the restricted passage. In FIG. 4 the stub shaft 54 is positioned in the slot nearest the shaft 58, and maximum arcuate motion about this shaft is achieved because the stub shaft is located at a minimum radius from the center of motion about shaft 58. The arm 48 has a fixed stroke, and this fixed stroke causes the upper dribble plate to oscillate at maximum amplitude.

The fine dribble mode of operation is illustrated in FIG. 5. The stub shaft 54 is positioned at the end of the slot 57 away from the shaft 58 and at a maximum radius from the center of motion about shaft 58. The arm 48 has a fixed stroke and the maximum radius between the stub shaft 54 and the shaft 58 causes minimum arcuate motion about the shaft 58. In this mode of operation the spaghetti is dribbled through the restriction at a minimum rate due to the minimized motion.

Referring to FIG. 1, the stub shaft is moved to the maximum radial position in the slot 57 away from the shaft 58 by a pneumatic cylinder 74. This cylinder has an operating shaft that engages a roller 74 mounted on the arm 48. The cylinder is controlled by a solenoid operated air valve 76 that is connected to a supply of compressed air (not shown). The stub shaft 54 is moved closer to the shaft 58 by retraction of the operating shaft and the urging of spring 50.

Referring to FIGS. 2 and 3, the restriction formed by the two dribble plates 64, 68, is also regulated by a gate 78 that can both throttle and block the discharge end 70 of the restriction. The gate includes a laterally extending plate 79 that is mounted for rotation about the shaft 80. The plate has series of slots (not shown) along its lower margin and these slots are matched by a series of complementary slots (not shown) in the margin of the discharge end of the upper dribble plate 64. The two series of slots permit the gate and the upper dribble plate to intermesh. Shaft 80 is journaled to the side plates 13 of the weigher and is rigidly connected to the arm 82. The arm 82 is pinned to two electrically operated solenoids 83, 84. Solenoid 83 is controlled by the microswitch 35, FIG. 2, and is energized when the blade 36 is depressed and de-energized when the blade is released.

Solenoid 84 is controlled by the photocell 38, FIG. 2. This solenoid is energized when the light beam is unblocked by the plate 30 and is de-energized when the light beam is blocked. The solenoid 83 has an operating shaft 57 that is pinned directly to the arm 82. The solenoid 84 has an operating arm 86 that includes an elongate slot 87 within which slides a pin 89 that connects it to the arm 82. The arm 82 is urged in a clockwise direction about the shaft 80 by a spring 90 that is attached to the side plate 13 of the weigher. This spring engages a rotatable member 91 that turns in a clockwise direction about the shaft 80 and is urged against the surface 92 which is an integral part of the arm 82. The rotatable member 91 is in effect a pivotable lever that urges the arm 82 in a clockwise direction as illustrated in FIG. 2.

The gate 78 moves between three positions. In the course dribble mode of operation, FIG. 4, the gate is free of the upper dribble plate 64 and the maximum discharge outlet 70 opening is obtained for the restricted path. In the fine dribble mode of operation, FIG. 5, the gate intermeshes with the discharge end of the upper dribble plate, thereby reducing the size of the discharge opening. The slots in the gate and the slots in the dribble plate permit the plate 79 to move as illustrated in FIG. 5. The amount of reduction in the effective size of the restricted path is adjusted by varying the position of the arm 82 with respect to the shaft 80. When the desired weight of spaghetti is reached, the gate shuts the discharge opening completely by abutting against the edge of the lower dribble plate 68, as illustrated in FIGS. 2 and 3. This stops any additional spaghetti from dribbling into the scale chute 26.

OPERATION

As described in detail below, the weighers 1, 2, FIG. 1, operate at either of two rates of dribbling. Immediately after the predetermined volume of spaghetti is deposited into the scale chute, the weighers operate in the course dribble mode and dribble additional product into the scale chute at a high rate. Next, as the desired weight is approached, the weighers shift into the fine dribble mode of operation. In this mode both the effective area of the restricted path and the amplitude of the oscillation of the path are reduced. Spaghetti is then dribbled into the scale chute at a relatively low rate. Thereafter when the desired weight is achieved, the restricted path is blocked and additional spaghetti is prevented from being dribbled into the scale chute.

More particularly, the two weighers 1 and 2 and all the chutes initially are empty. To begin operation, the main hopper 11 and the dribble hopper 12 are filled with spaghetti. The electric motor 14 is energized and the hoppers are then driven with a cyclical rotary motion that causes the spaghetti to run down the inclined bottom wall of the main hopper. The spaghetti falls into the first chute 18 and is collected on top of the closed gates 19. When the first chute is filled, the fingers 21 of the volumetric separator 22 are driven across the mouth of the chute and separate the spaghetti in the chute from the bulk spaghetti remaining in the main hopper. Thereafter, while the fingers 21 remain holding back the bulk product, the gates 19 open and drop the volumetrically separated spaghetti located below the fingers into the scale hopper 26.

When the spaghetti enters the scale chute 26, the course dribble mode of operation commences. Referring to FIG. 2, the spaghetti is retained in the scale chute by the closed intermeshed gates 94 in the bottom of the chute. Since the weight of the product separated by the volumetric separator is short of the desired weight, the scale chute remains counterbalanced in an elevated position and the scale arm 27 depresses the blade 36 of the microswitch 35. The dash pot 31 damps out any vibration in the scale arm due to the spaghetti falling into the scale chute. The depressed blade 36 of the microswitch causes solenoid 83 to be energized and its operating shaft 85 to be retracted. Retraction of the operating shaft causes the arm 82 to move in a counterclockwise direction about the shaft 80 as illustrated in FIG. 2 and to cause the plate 97 in the gate 78 to open fully, as illustrated in FIG. 4. The plate 79 is disengaged from the upper dribble plate 64 and the opening of the discharge end 70 of the restricted path is at its maximum. that causes the spaghetti to run down the inclined bottom wall of the main hopper. The spaghetti falls into the first chute 18 and is collected on top of the closed gates 19. When the first chute is filled, the fingers 21 of the volumetric separator 22 are driven across the mouth of the chute and separate the spaghetti in the chute from the bulk spaghetti remaining in the main hopper. Thereafter, while the fingers 21 remain holding back the bulk product, the gates 19 open and drop the volumetrically separated spaghetti located below the fingers into the scale hopper 26.

When the spaghetti enters the scale chute 26, the course dribble mode of operation commences. Referring to FIG. 2, the spaghetti is retained in the scale chute by the closed intermeshed gates 94 in the bottom of the chute. Since the weight of the product separated by the volumetric separator is short of the desired weight, the scale chute remains counterbalanced in an elevated position and the scale arm 27 depresses the blade 36 of the microswitch 35. The dash pot 31 damps out any vibration in the scale arm due to the spaghetti falling into the scale chute. The depressed blade 36 of the microswitch causes solenoid 83 to be energized and its operating shaft 85 to be retracted. Retraction of the operating shaft causes the arm 82 to move in a counterclockwise direction about the shaft 80 as illustrated in FIG. 2 and to cause the plate 97 in the gate 78 to open fully, as illustrated in FIG. 4. The plate 79 is disengaged from the upper dribble plate 64 and the opening of the discharge end 70 of the restricted path is at its maximum.

Depression of the blade 36 of the microswitch 35, FIG. 2, also energizes the air valve 76, FIG. 1, and causes the pneumatic actuator 74 to retract its operating arm. Referring to FIGS. 3 and 4, the spring 50 causes the arm 48 to rotate counter clockwise about the shaft 16 and to move the stub shaft 54 within the link 57 to the nearest radial position to the shaft 58. In this position the motion of the eccentric bearing 46 causes the dribble plate assembly 60 to have maximum oscillatory motion.

When the actuator plate 30, FIG. 2, is depressed, the light path to the photocell 38 is not blocked. This occurs during both the course and fine dribble modes of operation. When the light beam is unblocked, the solenoid 84 is energized causing its operating shaft 86 to be fully retracted. The retraction of the operating shaft 85 on the other solenoid causes the pin 88 on solenoid 84 to travel to the upper end of the slot 87 in the operating shaft 86. Thus, in the course dribble mode of operation both solenoids 83 and 84 are energized and their associated operating shafts are fully retracted. In addition, in this mode the pin 88 is moved to the upper end of the slot 87 in the operating shaft 86 thereby permitting the gate 78 to open fully.

Referring to FIG. 4, in the course dribble mode of operation the spaghetti moves into the restricted path by gravity. The lower dribble plate 68 is driven with a cyclical rotary motion and the upper dribble plate 64 moves with an oscillatory motion. The spaghetti enters the inlet 69 and is throttled by the rib 66 in the upper dribble plate. This rib blocks the flow of the product through the restriction and tends to reduce the vertical height of the product passing through the restricted path. The product thereafter flows along the moving lower dribble plate 68 and encounters a second rib 71 in the lower dribble plate. This second rib acts as a dam and forms a barrier that the spaghetti must cross before entering the scale chute 26. Both ribs extend laterally across the path of travel and help to maintain the orientation of the spaghetti. The combined motion of the upper and lower dribble plates causes the spaghetti to cascade single file over the rib 71 and to pass through the discharge end 70 of the restriction stick by stick.

As the weight of the spaghetti in the scale chute 26 approaches the desired weight, the dribbling apparatus shifts into a fine dribble mode of operation. Referring to FIG. 2, the increasing weight of the spaghetti in the scale chute 26 causes the scale arm 27 to pivot about the fulcrum 28 and to raise the actuator plate 30. When the actuator plate raises, the blade 36 on the microswitch 35 is released and causes the microswitch to de-energize the solenoid 83, FIG. 2, and the air valve 76, FIG. 1. When solenoid 83 is de-energized, the spring 90, FIG. 2, causes the operating shaft 85 to extend and to pull the pin 88 from the top of the slot 87 to the bottom of the slot. Since the light beam in the photocell 38 remains unblocked by the actuator plate 30, solenoid 84 remains energized and its associated operating shaft 86 remains retracted. When the pin 88 moves to the bottom of the slot 87, the arm 82 rotates in a clockwise manner about the shaft 80 as illustrated in FIG. 2, and causes the plate 79 to intermesh with the upper dribble plate 64 as illustrated in FIG. 5. The gate 78 thus causes the effective area of the restricted path to be reduced.

When the microswitch 35, FIG. 2, de-energizes the air valve 76, FIG. 1, the operating arm of the pneumatic actuator 74 extends and moves the stub shaft 54 on the arm 48 to the maximum radial position away from the shaft 58. Referring to FIG. 5, in this position the arm 56 is subjected to minimum arcuate motion by the arm 48. The upper dribble plate 64 is thus driven with an oscillatory motion of minimum amplitude. Simultaneously, the lower dribble plate 68 is driven in a cyclical rotary motion that remains unchanged because two hoppers 11, 12 are driven continuously by the electric motor 14.

The fine dribble mode of operation continues until the predetermined weight is achieved in the scale chute. The arrival of the predetermined weight is signaled by the blockage of the light to the photocell 38 which is caused by the rise of the actuator plate 30. The light beam is highly collimated and the orientation of the photocell is carefully adjusted so that precisely the desired weight is achieved. When the light in the photocell is blocked, solenoid 84 is de-energized and the spring 90, FIG. 2, causes the operating shaft 86 to extend fully. Heretofore, in the course dribble mode of operation the operating shaft 86 was fully retracted and the pin 88 was located at the bottom end of the slot 87. When solenoid 84 is de-energized, the pin 88 remains in the bottom of the slot and moves with the operating arm 86, causing the arm 82 to further rotate in a clockwise direction as illustrated in FIG. 2, about shaft 80. This motion of the arm 82 causes the plate 79 to abut against the lower dribble plate 68, and to close the opening at the discharge end of the restricted path. This closure of the restricted path is illustrated in FIGS. 2 and 3. When the path is fully closed, additional spaghetti is no longer dribbled into the scale chute 26, and the weight therein remains constant.

The weighing operation is completed when the gates 94, FIG. 1, in the scale chute 27 are opened and the spaghetti in the scale chute drops into the holding chute 96. The holding chute has two gates 97 in the bottom thereof for holding the spaghetti until the buckets 4 arrive at the weigher station. The gates 97 and the holding chute are controlled by a timing chain (not shown) which is driven from the main chain 8.

After the spaghetti drops through the scale chute 26, FIG. 2, the gates 94 are shut. When the weight is thus removed, the counterbalanced scale chute raises up and the actuator plate 30 descends to depress the blade 36 of the microswitch 35. When the blade is depressed, solenoid 83 is energized and the operating shaft 85 is retracted. This causes the gate 78 to rotate away from the upper dribble plate 64 as illustrated in FIG. 4. The microswitch further causes the air valve 76 to retract the operating shaft of the pneumatic actuator 74 which in turn causes the stub shaft 54 to return to radial position closest to the shaft 58 as illustrated in FIG. 4. The downward motion of the actuator plate 30, FIG. 2, also unblocks the light to the photocell 38 which in turn energizes solenoid 84. When solenoid 84 is energized, its operating shaft 86 is retracted. Pin 88 moves to its most upward position and against the upper end of the slot 87. This motion causes the gate 78 to open fully as illustrated in FIG. 4.

The apparatus next repeats a volumetric separation of the spaghetti in the first chute 18 and the operation repeats itself in the same manner as described above. The weighers operate in duplex in a cyclic manner so that the desired weights of spaghetti are deposited into the buckets 4, FIG. 1, each time the buckets stop at the weigher station.

The weighers separate bulk elongated products at higher speeds than heretofore obtainable because the volumetric separator and the duration of the two dribbling modes are adjusted to minimize the time required to fill the scale chute 26. In particular, the volumetric separator is set to measure off a quantity of spaghetti that is as close as possible to the desired weight. This quantity of spaghetti, however, is always short of the desired weight so that the weighers are always adding spaghetti into the scale chute. The duration of the course dribble mode of operation is maximized so that as much spaghetti as possible is dribbled into the scale chute in the shortest period of time before the desired weight is closely approached. The duration of the course dribble mode is adjusted by positioning the microswitch 35 and the vertical plate 30, FIG. 2. Also, the fine dribble mode of operation permits the weigher to operate at a very high dribble rate in the course mode and then to shift to fine dribble mode operation for adding the final few sticks of spaghetti into the chute.

The weighers separate elongated products with greater accuracy and the amount of overweight spaghetti in each package is reduced because the dribble rate of the weighers in the fine dribble mode is very low and can be terminated with a high degree of precision. The optical sensor 38 is adjusted to stop the addition of spaghetti precisely when the desired weight is achieved and to minimize the amount of overweight product in each package.

It should be understood that although the preferred embodiment incorporates a photocell 38 and a microswitch 35, FIG. 2, to sense the position of the scale arm 27, any sensing means actuated by a weighing means for producing a plurality of control responses is contemplated. Such mans include microswitches, optical sensors, and magnetic proximity switches. Further, it is contemplated that the lateral ribs 66, 71, FIG. 3, can be changed in shape or multiplied so as to precisely define the effective area of the restricted path. It is also contemplated within the scope of the present invention to replace the pneumatic cylinder 74, FIG. 1, with an actuator that can position the stub shaft at any point within the slot 57 so that the amplitude of the motion is smoothly decreased as the desired predetermined weight is approached.

Thus, although the best mode contemplated for carrying out the present invention has been herein shown and described, it will be apparent that modification and variation may be made without departing from what is regarded to be the subject matter of the present invention.

What is claimed is:

1. An apparatus for separating bulk elongated products into quantities of predetermined weight, comprising:
   (a) a weighing chute for receiving a predetermined volume of elongated product which is short of a desired predetermined weight and for receiving the elongated product dribbled therein as the weight of the product in the chute is brought up to the desired predetermined weight;
   (b) weighing means connected to the chute;
   (c) means actuated by the weighing means for producing a plurality of control responses as the amount of the product in the chute approaches the desired predetermined weight and when the desired weight is achieved; and
   (d) means responsive to said control responses for dribbling the product into the chute at a rate which is decreased as the desired weight is approached and for stopping further dribbling when the desired weight is achieved.

2. Apparatus as in claim 1 in which the product dribbling means includes:
   (a) spaced members forming a restricted path through which the elongated product moves; and
   (b) means for adjusting the dimensions of said path for decreasing the dribble rate.

3. Apparatus as in claim 2 in which said last means serves to reduce the dimensions of said path to stop further dribbling when the desired weight is achieved.

4. Apparatus as in claim 2 in which:
   (a) said spaced members extend generally parallel to each other and form upper and lower spaced walls inclined to the horizontal, the upper inclined ends of said walls forming an inlet end to the path and the lower inclined ends forming a discharge outlet, and including:
   (b) means for supplying the product to the upper inlet end of the path; and
   (c) means for reducing the effective dimensions of the path thereby to reduce the dribble rate of the product or to stop further dribbling.

5. Apparatus as in claim 4 in which barrier means is disposed in said path between the inlet and outlet ends, said barrier means serving to promote dribbling of product from the outlet at a desired rate.

6. Apparatus as in claim 5 in which the barrier means is in the form of ribs carried by the members and extending laterally across the path.

7. Apparatus as in claim 4 together with means for cyclically oscillating the upper member about an axis generally parallel to said members and at right angles to the direction of movement of the product through said path.

8. Apparatus as in claim 7 together with means for applying cyclic rotary motion to the lower member in the general plane of the same.

9. Apparatus as in claim 8 together with means for varying the amplitude of cyclic oscillation of the upper member, thereby enabling dribbling of the product at slower rates as the desired weight is approached.

10. An apparatus for dribbling an elongated product into a chute from a bulk source at a variable rate, comprising:
    (a) a weighing chute for receiving the product being dribbled;
    (b) a hopper for holding the bulk product prior to being dribbled;
    (c) spaced members forming a restricted path bridging the chute and the hopper, said members being adapted for throttling at a variable rate the product dribbled into the chute from the hopper;
    (d) weighing means for measuring the amount of weight that the product in the chute differs from a predetermined desired weight and for generating a plurality of control responses corresponding thereto; and
    (e) gate means for varying the effective area of the restricted path in response to said control responses so that the product is dribbled into the chute at a decreasing dribble rate as the desired weight is approached.

11. Apparatus as in claim 10 in which the gate means includes means for intermeshing with one of the spaced members in response to the control responses thereby reducing the effective area of the restricted path.

12. Apparatus as in claim 11 in which the gate means closes the restricted path when the desired weight is achieved thereby stopping further dribbling.

13. An apparatus for dribbling an elongated product into a chute from a bulk source at a variable rate, comprising:
    (a) a weighing chute for receiving the product being dribbled;
    (b) a hopper for holding the bulk product prior to being dribbled;
    (c) dribble feed means bridging the chute and the hopper, said means forming a restricted path for throttling the product dribbled into the chute from the hopper;
    (d) weighing means for measuring the amount of weight that the product in the chute differs from a predetermined desired weight and for generating a plurality of control responses corresponding thereto; and
    (e) means for applying cyclic motion to the dribble feed means at an amount corresponding to said control responses whereby the product is dribbled into the chute at a decreasing rate as the desired weight is approached.

14. Apparatus as in claim 13 in which the weighing means measures the amoount that the product is short of the predetermined desired weight, and the last named means decreases the amplitude of the cyclic motion as the amount of underweight is reduced.

15. Apparatus as in claim 13 in which the restricted path is formed by two vertically spaced, downwardly inclined members and the last named means includes means adapted for simultaneously oscillating one of the members and for driving the other member in a cyclic rotary path.

16. Apparatus as in claim 13 in which the means for applying cyclic motion includes:
    (a) a motor for driving an eccentric shaft, said eccentric shaft being connected to and adapted for driving an arm having a stub shaft thereon, said stub shaft being connected to a link having an elongate slot therein for receiving said stub shaft, said elongate slot being generally aligned tangent to a circle centered about the eccentric shaft, said link being rigidly connected to the dribble feed means and adapted for reciprocally oscillating said feed means; and
    (b) means for displacing the stub shaft within the elongate slot thereby varying both the effective length of the link and the amplitude of the motion transmitted from the eccentric shaft to the dribble feed means.

17. Apparatus as in claim 16 in which the stub shaft displacing means is a pneumatic cylinder actuated by the weighing means and adapted for increasing the effective length of the link, thereby reducing the amplitude of the motion transmitted to the dribble feed means as the amount of underweight is reduced.

18. A method for separating bulk elongated products into quantities of predetermined weight, comprising the steps of:
    (a) depositing into a chute a quantity of elongated product which is short of a desired predetermined weight;
    (b) weighing the product in the chute;
    (c) dribbling the elongated product into the chute through a restricted path formed by spaced members so as to bring the weight of the product in the chute up to the desired predetermined weight;
    (d) reducing the dimensions of said path to decrease the rate of dribbling as the weight of the product in the chute is brought up to the desired predetermined weight; and
    (e) stopping further dribbling when the desired weight is achieved.

19. Method of claim 18 including the step of:

(a) blocking the restricted path when the desired weight is achieved.

20. A method for separating bulk elongated products into quantities of predetermined weight, comprising the steps of:
   (a) depositing into a chute a quantity of elongated product which is short of a desired predetermined weight;
   (b) weighing the product in the chute;
   (c) dribbling the product into the chute through a restricted path so as to bring the weight of the product in the chute up to the desired predetermined weight, said restricted path being formed by two spaced members aligned generally parallel with each other;
   (d) cyclically oscillating one member about an axis generally parallel with said member and at right angles to the direction of movement of the product through the restricted path;
   (e) simultaneously applying cyclic rotary motion to the other member in the general plane of the same
   (f) decreasing the rate of dribbling as the weight of the product in the chute is brought up to the desired predetermined weight; and
   (g) stopping further dribbling when the desired weight is achieved.

21. Method of claim 20 including the step of:
   (a) varying the amplitude of cyclical oscillation of said member thereby dribbling the product at slower rates as the desired weight is approached.

* * * * *